(12) United States Patent
Blain

(10) Patent No.: US 11,534,980 B2
(45) Date of Patent: Dec. 27, 2022

(54) HIGH VOLUME MANUFACTURING METHOD FOR PRECISION ARTICLES BASED ON THREE-DIMENSIONAL PRINTING INCLUDING A 3D TAG

(71) Applicant: 3D Systems, Inc., Rock Hill, SC (US)

(72) Inventor: Colin Leonard Blain, Rock Hill, SC (US)

(73) Assignee: 3D Systems, Inc., Rock Hill, SC (US)

( * ) Notice: Subject to any disclaimer, the term of this patent is extended or adjusted under 35 U.S.C. 154(b) by 206 days.

(21) Appl. No.: 17/099,842

(22) Filed: Nov. 17, 2020

(65) Prior Publication Data

US 2021/0146632 A1 May 20, 2021

Related U.S. Application Data

(60) Provisional application No. 62/936,937, filed on Nov. 18, 2019.

(51) Int. Cl.
| | | |
|---|---|---|
| B29C 64/393 | (2017.01) | |
| B29C 64/129 | (2017.01) | |
| B29C 64/255 | (2017.01) | |
| B29C 64/245 | (2017.01) | |
| B33Y 10/00 | (2015.01) | |
| B33Y 50/02 | (2015.01) | |

(52) U.S. Cl.
CPC .......... *B29C 64/393* (2017.08); *B29C 64/129* (2017.08); *B29C 64/245* (2017.08); *B29C 64/255* (2017.08); *B33Y 10/00* (2014.12); *B33Y 50/02* (2014.12)

(58) Field of Classification Search
CPC .................................................. B29C 64/393
See application file for complete search history.

(56) References Cited

U.S. PATENT DOCUMENTS

| | | | |
|---|---|---|---|
| 7,306,152 B2 | 12/2007 | Culp et al. | |
| 2012/0281013 A1* | 11/2012 | Mahdavi | G06T 19/00 |
| | | | 345/619 |
| 2013/0027901 A1 | 1/2013 | Martin et al. | |
| 2015/0235069 A1* | 8/2015 | Kumar | G06K 19/06159 |
| | | | 700/118 |
| 2016/0260001 A1* | 9/2016 | Flores | G06K 1/121 |
| 2017/0311164 A1* | 10/2017 | Shin | B33Y 50/02 |
| 2018/0012311 A1 | 1/2018 | Small et al. | |
| 2018/0257306 A1* | 9/2018 | Mattingly | H04L 9/0643 |
| 2020/0189190 A1* | 6/2020 | Sabo | B33Y 50/02 |

FOREIGN PATENT DOCUMENTS

WO WO-2018135736 A1 * 7/2018 ............. B29C 64/10

* cited by examiner

*Primary Examiner* — Suresh Suryawanshi

(57) ABSTRACT

A method for manufacturing a three-dimensional (3D) article includes: (1) receiving a solid model defining a 3D article, (2) receiving information defining an information bearing image which can includes machine and/or human readable indicia, (3) defining a solid model of a 3D tag to be attached to the article, the 3D tag having thick sections and thin sections that define the information bearing image, (4) merging the solid model of the 3D article with the solid model of the 3D tag to provide a composite solid model defining the 3D article integral with the 3D tag, (5) sending the composite solid model to an additive manufacturing system, and (6) operating the additive manufacturing print engine to integrally fabricate the 3D article and 3D tag from a single material.

11 Claims, 3 Drawing Sheets

HIGH VOLUME MANUFACTURING METHOD FOR PRECISION ARTICLES BASED ON THREE-DIMENSIONAL PRINTING INCLUDING A 3D TAG

CROSS-REFERENCE TO RELATED APPLICATIONS

This non-provisional patent application claims priority to U.S. Provisional Application Ser. No. 62/936,937, Entitled "High Volume Manufacturing Method for Precision Articles Based on Three-Dimensional Printing" by Colin L. Blain, filed on Nov. 18, 2019, incorporated herein by reference under the benefit of U.S.C. 119(e).

FIELD OF THE INVENTION

The present disclosure concerns and apparatus for a manufacture of usable articles from processes that include additive manufacturing. More particularly, the present disclosure concerns a way of using three-dimensional printing to manufacture an article with an attached coding or indicia.

BACKGROUND

Additive manufacturing is in wide use for prototyping and manufacture of articles. One challenge is how to efficiently track and trace individual manufactured articles.

SUMMARY

In an aspect of the disclosure, a method for manufacturing a three-dimensional (3D) article includes: (1) receiving a solid model defining a 3D article, (2) receiving information defining an information bearing image, the information bearing image defining one or more of a barcode, a two-dimensional barcode, a quick response (QR) code, a set of machine readable indicia, and a set of human readable indicia, (3) defining a solid model of a 3D tag to be attached to the article, the 3D tag having a varying thickness including thick sections to define dark regions and thin sections to define light regions of the information bearing image as a result of radiation attenuation that varies according to thickness of the tag, (4) merging the solid model of the 3D article with the solid model of the 3D tag to provide a composite solid model defining the 3D article integral with the 3D tag, (5) sending the composite solid model to an additive manufacturing system, and (6) operating the additive manufacturing print engine to integrally fabricate the 3D article and 3D tag from a single material. The single material can be a photocurable resin. Because the tag encodes information with a varying thickness, there is no need for any post processes to define the information bearing image. Thus, the tag is formed with no added process steps.

In one implementation, the method further includes: (7) operating a light source to illuminate the tag with radiation, some of the radiation passes from a backside of the tag to a front side of the tag, (8) operating a camera to receive radiation from the tag, and (9) determining the information bearing image from the radiation from the 3D tag based on a relatively greater radiation intensity from the thin sections and relatively lesser intensity from the thick sections of the tag. The light source and camera can be on opposites sides of the 3D tag so that radiation passing through the 3D tag passes through the 3D tag one time between the light source and the camera. The light source and the camera can be on the same side of the 3D tag such that light passes from the light source, through the 3D tag, to a reflector, back through the 3D tag, and to the camera.

In yet another implementation, the additive manufacturing print engine includes a motorized support, a light engine, and a resin vessel. Operating the print engine can include: (1) operating the motorized support to position a surface of the 3D article and/or the tag at a build plane, (2) operating the light engine to selectively solidify a layer of photocurable resin onto the surface of the 3D article, and repeating (1) and (2) to complete fabrication of the 3D article integrated with the tag from a single material. With this method of manufacturing, the 3D tag bearing information can be efficiently produced with no added process steps.

DETAILED DESCRIPTION OF THE PREFERRED EMBODIMENTS

Figure 1:
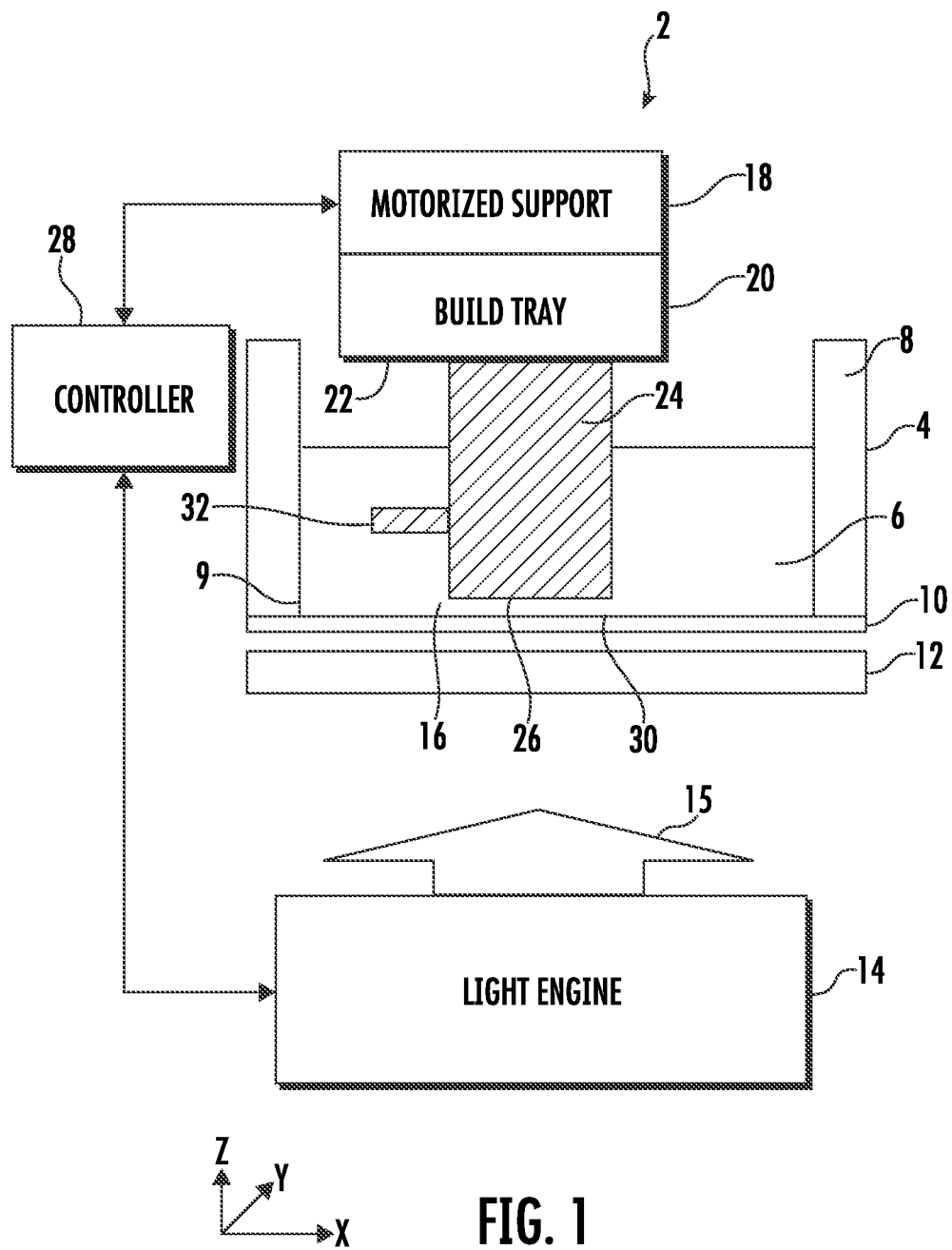
FIG. 1 is a schematic diagram of a print engine coupled to a controller.

FIG. 1 is a schematic diagram of an embodiment of a three-dimensional print engine 2. In describing print engine 2, axes X, Y, and Z can be used. Axes X and Y are generally horizontal and axis Z is generally vertical and generally aligned with a gravitational reference. As discussed herein, the term "generally" refers to having a dimension, an angle, or other parameter that is within manufacturing or placement tolerances.

Print engine 2 includes a resin vessel 4 for containing resin 6. Resin vessel 4 includes a vessel body 8 that defines a central opening 9. The central opening 9 is closed by a transparent sheet 10. The transparent sheet 10 is formed from an optically clear material that has a permeability to a reaction inhibitor such as oxygen (from ambient air or from another oxygen source).

The resin vessel 4 is supported by a support plate 12. The support plate 12 includes a central transparent opening and/or plate (to be shown in subsequent figures) that is laterally aligned with the transparent sheet 10. A light engine 14 is configured to project pixelated light 15 up through the support plate 12, through the transparent sheet 10, and to a build plane 16 within the resin 6. The build plane 16 is a lateral region of the resin 6 that can be imaged by the light engine 14.

A motorized support 18 is configured to vertically position a build tray 20. Build tray 20 has a surface 22 for supporting a three-dimensional (3D) article 24 being fabricated by system 2. The 3D article 24 has a distal surface 26 that is in facing relation with the transparent sheet 10 and is proximate to the build plane 16.

The motorized support 18 is a motorized device for vertically positioning the build tray 20 and outputting an encoder signal that is indicative of a vertical position of the build tray 20. In an illustrative embodiment, the motorized support 18 includes a vertically fixed portion and a vertically moving portion. The vertically moving portion supports the build tray and includes a threaded bearing. The vertically fixed portion includes a motor coupled to a lead screw which is received within the threaded bearing. As the motor rotates the lead screw, the action upon the threaded bearing translates the build tray up or down, depending upon the rotational direction of the lead screw.

A controller 28 is coupled to the print engine 2 and the light engine 14 and the motorized support 18. Controller 28 includes a processor coupled to an information storage device. The information storage device includes a nonvolatile or non-transient storage device storing software instructions. When the software instructions are executed by the processor, they operate the light engine 14 and motorized support and perform the following steps: (1) Operate the motorized support 18 to position surface 22 (or afterwards surface 26) at build plane 16. (2) Operate light engine 14 to selectively solidify a layer of resin onto surface 22 or 26. (3) Repeat (1) and (2) to complete fabrication of the 3D article 24. The 3D article 24 includes a three-dimensional (3D) tag 32. 3D tag 32 is a three-dimensional portion of the 3D article 24 that is printed from a single material. In the illustrative embodiment, the 3D article 24 is printed from the same single material.

The controller 28 may be a single controller that is integrated with a print engine 2 or it can include a plurality of different computers that are locally or remotely located relative to the print engine 2. The controller 28 can include one or more of a local controller, a host computer, a mobile device, a tablet computer, a smartphone, and a server to name some examples. The controller 28 can include an information technology (IT) system 52 (discussed infra) and performs more functions in addition to operating the print engine 2.

Figure 2A:
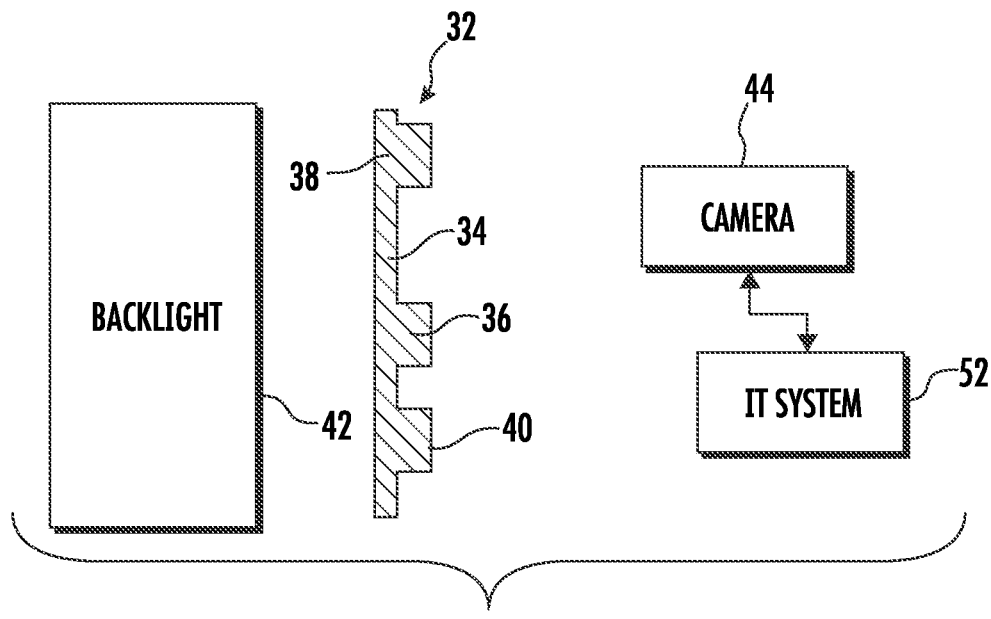
FIG. 2A is a schematic diagram a three-dimensional tag being scanned by a first embodiment of a camera and illumination system.
Figure 2B:
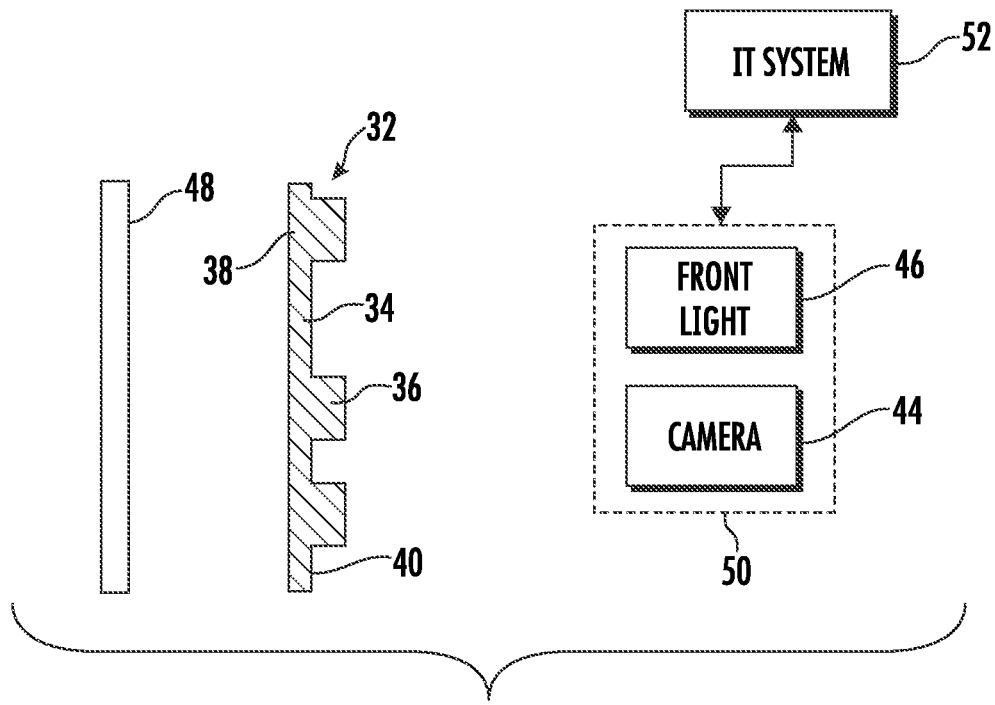
FIG. 2B is a schematic diagram a three-dimensional tag being scanned by a second embodiment of a camera and illumination system.

FIGS. 2A and 2B illustrate an embodiment of the three-dimensional (3D) tag 32 that is being scanned by a first system (2A) and a second system (2B). The 3D tag 32 is fabricated from single material such as a photocurable polymer. The 3D tag 32 has thin sections 34 and thick sections 36. The tag 32 has a back side 38 and a front side 40.

FIG. 2A depicts a light source (backlight) 42 that faces and projects radiation onto the back side 38 of the 3D tag 32. A camera 44 receives radiation from the front side 40 that has passed through the 3D tag 32 from the backlight 42 to the back side 38 to the front side 40 and to the camera 44. The material of the 3D tag 32 attenuates and absorbs the radiation as it passes from the back side 38 to the front side 40. When viewed from the front side 40 of the 3D tag 32, the thick sections 36 of the 3D tag 32 appear relatively dark and the thin sections 34 appear relatively bright due to an increased attenuation loss of radiation through the thick sections of the tag 32. In this way, a single material for the 3D tag 32 provides a linear or two dimensional array of information to be captured by the camera 44.

FIG. 2B illustrates an alternative embodiment using a front light 46 and a reflective material surface 48. The front light 46 emits radiation that passes to the front side 40 of the tag 32, through the tag 32, to the reflective surface 48, back to the back side 38 of the tag 32, through the tag 32, and to camera 44. In this arrangement, the thick sections 36 of the tag 32 appear dark compared to the thin sections 34 of the tag 32. In one embodiment, the camera 44 and front light 46 can be part of a mobile device 50 such as a smart phone or tablet computer.

The 3D tag 32 can take on any number of designs such as a linear array of variable width stripes (linear barcode), a two-dimensional array of squares (two dimensional barcode), or a QR (quick response) code, to name some examples. The camera 44 and/or mobile device 50 is in communication with an information technology (IT) system 52 that can capture the 3D tag 32 information for purposes of tracking and tracing the 3D article 24 associated with the 3D tag 32.

Figure 3:
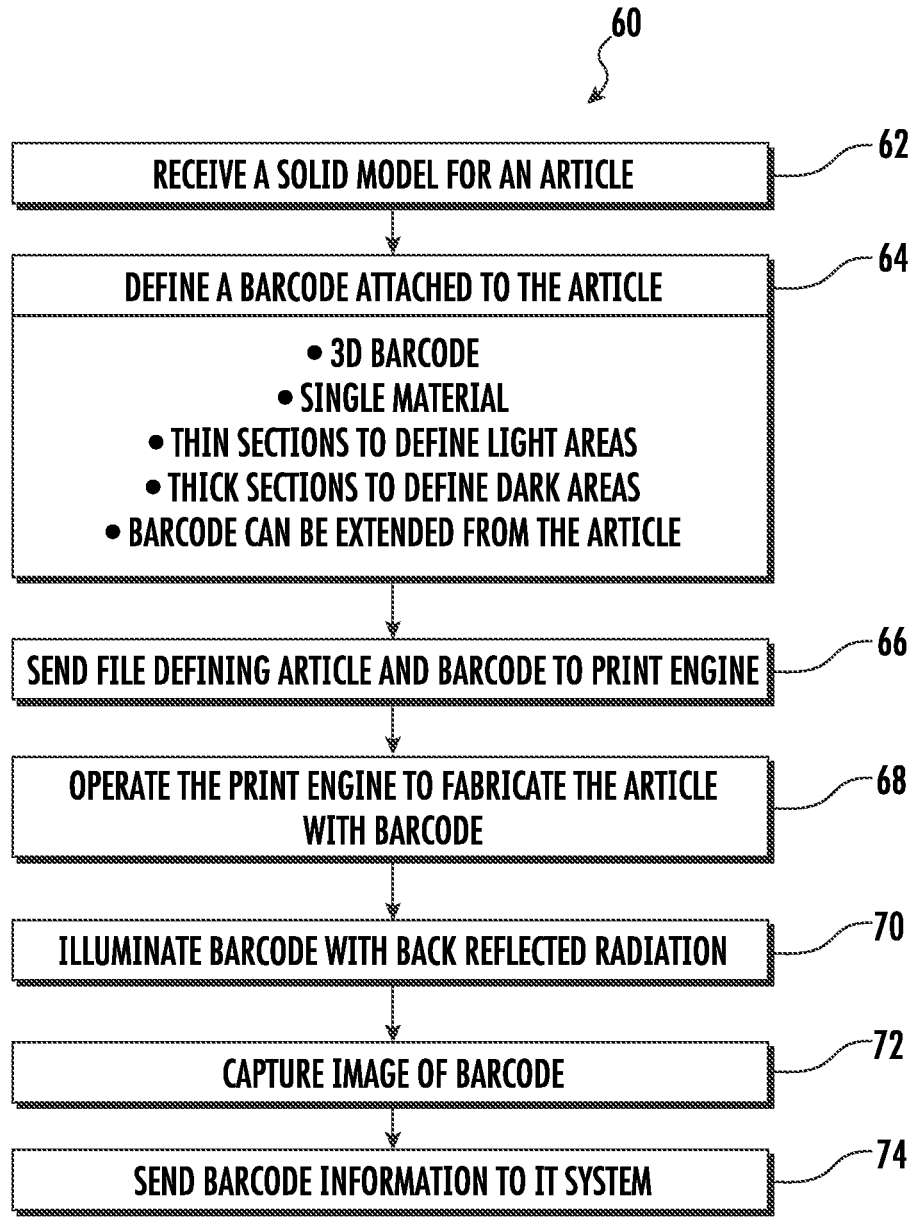
FIG. 3 is a flowchart of an embodiment of a method for manufacturing an articles.

FIG. 3 is a flowchart depicting a manufacturing method 60 for 3D article 24. The steps of method 60 are performed by controller 28. The controller 28 includes a processor and a non-transitory computer readable storage or memory that store software instructions. When executed by the processor, the controller performs the method 60. The steps of the manufacturing method may not all be performed in a single sequence but can occur two or three separate sequences with delays between the sequences.

According to 62 a solid model is received that defines the 3D article 24. According to 64, a three-dimensional tag 32 is defined to be fabricated from a single material and having thick 36 and thin 34 sections for defining dark and light portions of the tag 32 respectively.

As part of step 64, the following can be included: (a) receiving information defining an information bearing image, the information bearing image defining one or more of a barcode, a two-dimensional barcode, a quick response (QR) code, a set of machine readable indicia, and a set of human readable indicia, (b) defining a solid model of a 3D tag to be attached to the article, the 3D tag having thick sections and thin sections that define the information bearing image, (c) merging the solid model of the 3D article with the solid model of the 3D tag to provide a composite solid model defining the 3D article integral with the 3D tag.

According to 66 a file defining the 3D article 24 with the tag 32 (composite model) is sent to a print engine 2 (otherwise referred to as an additive manufacturing system 2). According to 68, the print engine 2 prints the 3D article 24 integral with the 3D tag 32.

According to 70, the tag 32 is illuminated with radiation as illustrated in FIG. 2A or 2B. According to 72, camera 44 captures an image of the 3D tag 32 and generates 3D tag 32 information. Finally, according to 74, 3D tag 32 information is sent to an IT system.

While FIG. 1 illustrates a particular three-dimensional print engine 2 it is to be understood that the three-dimensional arrangement 24 of articles 32 can be fabricated by other additive manufacturing systems 2 based upon lasers that polymerize layers of a photocurable resin in a vat. With some additive manufacturing systems 2, the three-dimensional arrangement 24 may be supported above a support platen and the lasers can solidify layers of resin from above. The three-dimensional arrangement 24 can also be fabricated by other additive manufacturing systems 2 that fuse layers of polymer powder.

The specific embodiments and applications thereof described above are for illustrative purposes only and do not preclude modifications and variations encompassed by the scope of the following claims.

What is claimed:

1. A method of manufacturing a three-dimensional (3D) article comprising:
    receiving a solid model defining a 3D article;
    receiving information defining an information bearing image, the information bearing image defining one or more of a barcode, a two-dimensional barcode, a quick response (QR) code, a set of machine readable indicia, and a set of human readable indicia;
    defining a solid model of a 3D tag to be attached to the article, the 3D tag having a varying thickness including thick sections to define dark regions and thin sections to define light regions of the information bearing image as a result of radiation attenuation that varies according to thickness of the 3D tag;

merging the solid model of the 3D article with the solid model of the 3D tag to provide a composite solid model defining the 3D article integral with the 3D tag;

sending the composite solid model to an additive manufacturing system;

operating the additive manufacturing print engine to integrally fabricate the 3D article and 3D tag from a single material; and operating a light source to illuminate the 3D tag with radiation, a portion of the radiation passes from a backside of the 3D tag to a front side of the 3D tag;

operating a camera to receive radiation from the 3D tag; and determining the information bearing image from the radiation from the 3D tag based on a relatively greater radiation intensity from the thin sections and relatively lesser intensity from the thick sections of the 3D tag.

2. The method of claim 1 wherein illuminating the 3D tag with radiation includes positioning the 3D tag in front of the light source which transmits the radiation through the 3D tag to the camera.

3. The method of claim 1 wherein illuminating the 3D tag with radiation includes:
   positioning the 3D tag with a back side of the 3D tag facing a reflective surface;
   illuminating the 3D tag from a front side, the radiation passes through the 3D tag, to the reflective surface, and back through the 3D tag after reflecting from the reflective surface.

4. The method of claim 1 wherein the single material is a photocurable resin.

5. The method of claim 1 wherein the additive manufacturing print engine includes a motorized support, a light engine, and a resin vessel, and operating the print engine includes:
   (1) operating the motorized support to position a surface of the 3D article and/or the 3D tag at a build plane;
   (2) operating the light engine to selectively solidify a layer of photocurable resin onto the surface of the 3D article; and
   repeating (1) and (2) to complete fabrication of the 3D article integrated with the 3D tag from a single material.

6. A non-transient storage system storing software instructions, that when executed by a processor, perform the following steps:
   receive a solid model defining a 3D article;
   receive information defining an information bearing image, the information bearing image defining one or more of a barcode, a two-dimensional barcode, a quick response (QR) code, a set of machine readable indicia, and a set of human readable indicia;
   define a solid model of a 3D tag to be attached to the 3D article, the 3D tag having a varying thickness including thick sections to define dark regions and thin sections to define light regions of the information bearing image as a result of radiation attenuation that varies according to thickness of the 3D tag;
   merge the solid model of the 3D article with the solid model of the 3D tag to provide a composite solid model defining the 3D article integral with the 3D tag;
   send the composite solid model to an additive manufacturing system; and
   operate the additive manufacturing print engine to integrally fabricate the 3D article and 3D tag from a single material;
   operate a light source to illuminate the 3D tag with radiation, some of the radiation passes from a backside of the 3D tag to a front side of the 3D tag;
   operate a camera to receive radiation from the 3D tag; and
   determine the information bearing image from the radiation from the 3D tag based on a relatively greater radiation intensity from the thin sections and relatively lesser intensity from the thick sections of the 3D tag.

7. The non-transient storage system of claim 6 wherein the additive manufacturing print engine includes a motorized support, a light engine, and a resin vessel, and operating the print engine includes:
   (1) operate the motorized support to position a surface of the 3D article and/or the 3D tag at a build plane;
   (2) operate the light engine to selectively solidify a layer of photocurable resin onto the surface of the 3D article; and
   repeat (1) and (2) to complete fabrication of the 3D article integrated with the 3D tag from a single material.

8. A system for manufacturing a 3D article comprising an additive manufacturing system and a controller configured to:
   receive a solid model defining a 3D article;
   receive information defining an information bearing image, the information bearing image defining one or more of a barcode, a two-dimensional barcode, a quick response (QR) code, a set of machine readable indicia, and a set of human readable indicia;
   define a solid model of a 3D tag to be attached to the 3D article, the 3D tag having a varying thickness including thick sections to define dark regions and thin sections to define light regions of the information bearing image as a result of radiation attenuation that varies according to thickness of the 3D tag;
   merge the solid model of the 3D article with the solid model of the 3D tag to provide a composite solid model defining the 3D article integral with the 3D tag;
   send the composite solid model to an additive manufacturing system; and
   operate the additive manufacturing print engine to integrally fabricate the 3D article and 3D tag from a single material;
   operate a light source to illuminate the 3D tag with radiation, some of the radiation passes from a backside of the 3D tag to a front side of the 3D tag;
   operate a camera to receive radiation from the 3D tag; and
   determine the information bearing image from the radiation from the 3D tag based on a relatively greater radiation intensity from the thin sections and relatively lesser intensity from the thick sections of the 3D tag.

9. The system of claim 8 wherein the light source faces the back side of the 3D tag and the camera faces the front side of the 3D tag.

10. The system of claim 8 further comprising a reflective surface facing the back side of the 3D tag, the light source faces the front side of the 3D tag.

11. The system of claim 8 further comprising a motorized support, a light engine, and a resin vessel, the controller is further configured to:
   (1) operate the motorized support to position a surface of the 3D article and/or the 3D tag at a build plane;
   (2) operate the light engine to selectively solidify a layer of photocurable resin onto the surface of the 3D article; and repeat (1) and (2) to complete fabrication of the 3D article integrated with the 3D tag from a single material.

* * * * *